United States Patent [19]

Struger

[11] 4,322,771

[45] Mar. 30, 1982

[54] TRIAC-PROTECTED OUTPUT CIRCUIT

[75] Inventor: Odo J. Struger, Chagrin Falls, Ohio

[73] Assignee: Allen-Bradley Company, Milwaukee, Wis.

[21] Appl. No.: 108,385

[22] Filed: Dec. 31, 1979

[51] Int. Cl.³ .............................................. H02H 5/04
[52] U.S. Cl. .................................... 361/104; 323/283
[58] Field of Search .................. 323/22 R, 22 SC, 24, 323/282, 283; 361/54, 55, 104

[56] References Cited

U.S. PATENT DOCUMENTS

| 3,745,546 | 7/1973 | Struger et al. | 340/250 |
| 3,761,734 | 9/1973 | Windecker | 361/104 |
| 4,222,087 | 9/1980 | Goodrich | 361/104 |

Primary Examiner—William M. Shoop

Attorney, Agent, or Firm—Quarles & Brady

[57] ABSTRACT

A secondary, protective triac is connected in series with a main load-control triac in an a-c output circuit for a programmable controller. The two triacs are coupled to a pair of digital inputs and when the main triac is conducting the secondary triac is not conducting—unless the main triac stays "on" after an "off" signal is received, signifying a shorted main triac. If that occurs, a triac-failure fuse is blown and the secondary triac switches to conduct current and complete a virtually short circuit through a main power fuse. The blowing of the triac-failure fuse illuminates a neon bulb to give an indication of a main triac failure, and the blowing of the main power fuse illuminates a corresponding neon bulb to indicate a failure on the module and its disconnection from the load.

6 Claims, 2 Drawing Figures

TRIAC-PROTECTED OUTPUT CIRCUIT

BACKGROUND OF THE INVENTION

1. Field of the Invention

The field of the invention is controller output circuits, and particularly, those included in circuit modules used in programmable controller I/O interface racks such as that disclosed in Struger, et al., U.S. Pat. No. 4,151,580, issued Apr. 24, 1979.

2. Description of the Prior Art

A controller output circuit for a prior controller is disclosed in Struger, et al., U.S. Pat. No. 3,745,546, issued July 10, 1973. There an output drive circuit for a programmable controller includes a triac (a bidirectional triode thyristor) connected in series with an a-c power supply, a fuse and a controlled external load. The fuse is shunted by a neon indicator lamp and the triac is shunted by a high impedance path through a resistor and a capacitor. When the fuse blows the triac is turned off and current flows through the neon bulb to indicate a fault.

There are several possible sources of faults in such output circuits, and it is desirable to pinpoint the source of such faults to prevent the repetitive blowing of fuses or the degradation of the output devices controlled by the output circuits. Where a triac is included in the output drive circuit, it is desirable to know whether the triac itself has failed.

SUMMARY OF THE INVENTION

The invention provides a secondary, protective triac connected in series with a first, load-control triac. These two triacs are coupled to a pair of digital inputs and when the main triac is conducting the secondary triac is not conducting—unless the main triac stays "on" after an "off" signal is received by the triacs through the digital inputs. If that occurs, the secondary triac switches to conduct current and complete a virtually short circuit through a main fuse, blowing the fuse and interrupting power to the load.

The invention further provides a triac failure indicator, in addition to a module failure indicator that is activated when the main fuse is interrupted. The triac failure indicator is connected in series with a switch in a secondary fuse that is operated when an "off" signal is received while the main triac is still conducting. When this happens, the switch is operated to apply a signal that illuminates the triac failure indicator.

The invention is effective for secondary triac failures, as well as main triac failures, because the main fuse will be blown if the main triac is turned "on" while the secondary triac is conducting. The secondary triac does not conduct during normal operation.

It is a primary object of the invention to protect against a triac short circuit failure in an a-c output drive circuit.

It is another object of the invention to more precisely indicate the cause of failures in output drive circuits for ease of servicing such circuits.

It is another object of the invention to provide a time delay between the "off" signal to the main triac and the "on" signal to the secondary triac. Without this time delay the secondary triac might turn on before the main triac is turned off, giving a false indication that the main triac has failed.

It is another object of the invention to economize in the number of bulbs required for indicating triac failures in an output drive module.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
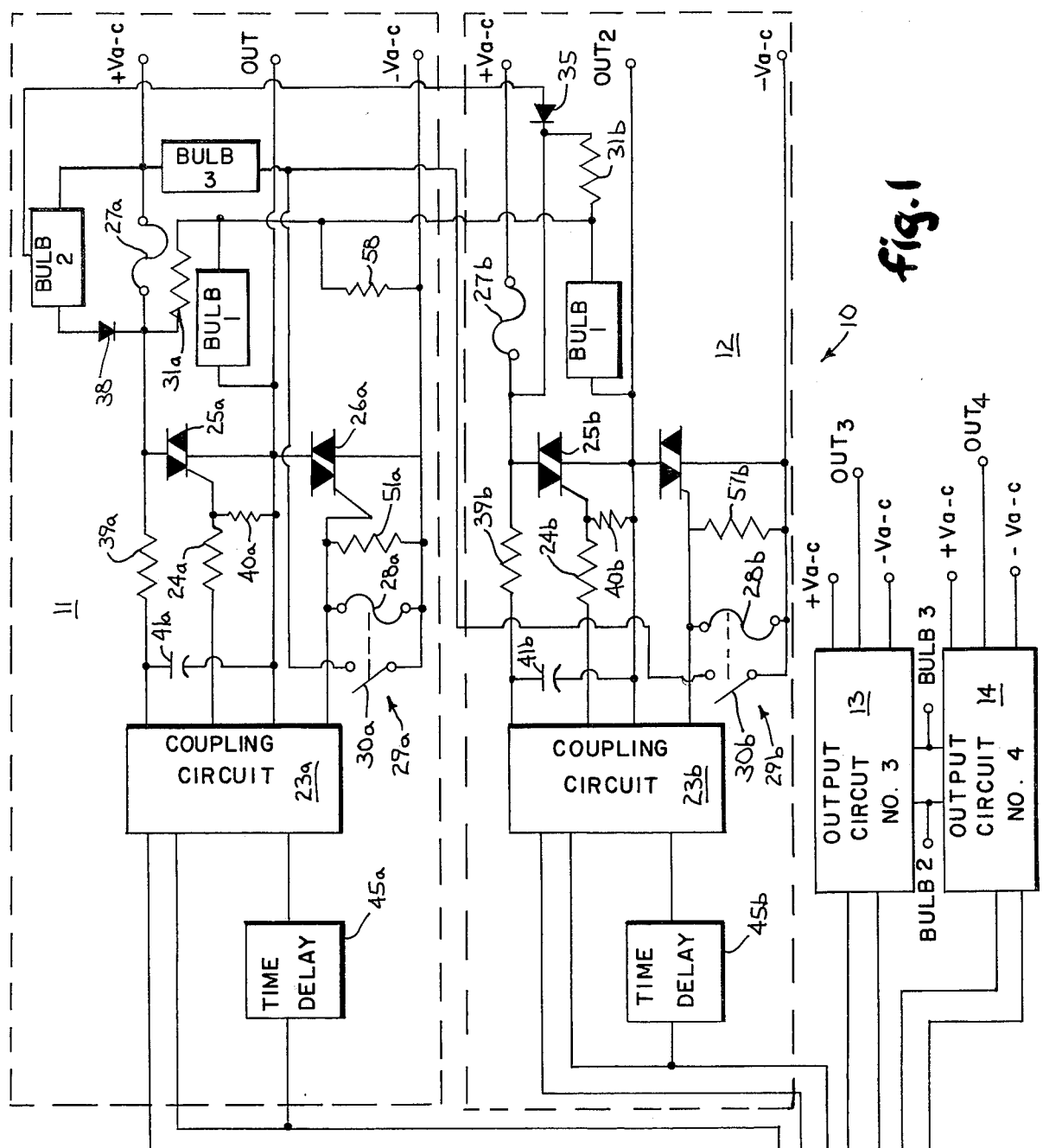
FIG. 1 is an electrical schematic diagram of an a-c output module for a programmable controller in which the invention is employed.

Referring to FIG. 1, an output drive module 10 has four output drive circuits 11–14 that incorporate the present invention. The module 10 is adapted to be inserted in an I/O interface rack such as that disclosed in Struger, et al., U.S. Pat. No. 4,151,580, issued Apr. 24, 1979, where it can be connected to four a-c output devices (not shown). Each output device is connected between a first load terminal $OUT_1$—$OUT_4$ and a second load terminal $-V_{a\text{-}c}$, which is also connected to the low side of an a-c voltage supply (not shown in the drawings). Each output drive circuit 11–14 also has another terminal $+V_{a\text{-}c}$, which is connected to the high side of the a-c voltage supply.

The a-c output signals to the four output devices are controlled by digital input signals to inputs "00"–"03." The output module 10 is grouped with another module for addressing purposes, so that a byte of output data can be coupled to the module group during an I/O scan routine of the type familiar to those skilled in the art. When a module pair is addressed an enabling signal is received at a SEN (slot enable) input. Signals are also received at a WRITE input and a STROBE input on the module during the time interval in which the data is written into the output circuits 11–14.

The slot enable, write and strobe signals are coupled through a low true OR gate 15 in a signal-conditioning circuit 16 that has an output connected to a clock input on a 4-bit latch 17. The signal-conditioning circuit 16 includes a resistor 18 connecting the output of the OR gate 15 through an inverter 19 to an input on a second three-input low true OR gate 20. A capacitor 21 has its positive plate connected at the junction between the resistor 18 and the inverter 19, and has its negative plate connected to a signal ground. The STROBE line is coupled to a second input on the second OR gate 20 and the third input of this OR gate 20 is grounded. The output of this OR gate 20 is coupled through a NOR gate 21 to the clock input on the latch 17. Besides the clock input, the latch 17 also has a reset input (R) at which a signal is received through an I/O RESET line and an inverter 22 when the latch 17 is to be reset. The latch 17 has four "high true" outputs $\overline{Q1}$–$\overline{Q4}$, and four "low true" outputs Q1–Q4. When data is coupled to the I/O output module 10 during the I/O scan routine it will be coupled through a set of inverters 9 to the latch inputs D1–D4 and will then appear at the latch outputs $\overline{Q1}$–$\overline{Q4}$ and Q1–Q4.

Each high true and low true pair of outputs on the latch 17 is connected to a coupling circuit in one of the output drive circuits 11–14. The coupling circuit 23a provides actuate signals to the gate of a main or load-control triac 25a, and to the gate of a secondary triac 26a under certain conditions. The main triac 25a is connected in series with a main fuse 27a between the $+V_{a-c}$ terminal and the first load output terminal OUT$_1$ on the first drive circuit 11. The secondary triac 26a is connected in series with the main triac 25a and is also connected between the OUT$_1$ terminal and the $-V_{a-c}$ terminal.

When the a-c power is transmitted to the load, the main triac 25a conducts a current, while the secondary triac 26a remains "off." Thus with a nominal 120 volt a-c supply, the voltage drop across the main triac 25a is approximately two volts while the voltage appearing across the secondary triac 26a and the load terminals is approximately 118 volts. The main triac 25a is turned on when a sufficient actuate signal is coupled from the coupling circuit 23a through a resistor 24a to the gate on the main triac 25a. When the a-c output signal to the load is to be turned "off" this gate signal is removed, and in accordance with the standard operating characteristic of a triac, it stops conducting when the a-c waveform reaches a zero level between positive and negative half cycles.

If the main triac 25a remains on, however, due to a short circuit failure through it, it would give a false reading to the processor in the programmable controller while continuing to supply an a-c output signal to the load, which may or may not cause the main fuse 27a to blow. In this situation, it is desirable to interrupt the a-c output signal to the load and to signal the operator of a triac failure. This is accomplished by providing the secondary triac 26a in series with the main triac 25a.

The "on" signal for generating an actuate signal to the gate of the secondary triac 26a, is under normal circumstances, the "off" signal to remove the actuate signal from the gate of the main triac 25a. If the main triac 25a remains "on" after an "off" signal is received through the "00" digital input, the supply voltage will be imposed across the main triac 25a and a secondary fuse link 28a that is connected between the gate input on the secondary triac 26a and the $-V_{a-c}$ terminal. Enough current will pass through the secondary fuse 29a to interrupt the fuse link 28a and actuate a switch 30a which is part of the fuse 29a. The current rating of the secondary fuse 29a is selected so that it will be interrupted first, before the main fuse 27a is interrupted to cut off a-c power to the load.

When the fuse link 28a is interrupted, a current passes through resistor 51a and generates sufficient voltage at the gate of the secondary triac 26a to cause it to conduct. With this triac 26a conducting there is a virtual short circuit across the main fuse 27a and the two triacs 25a and 26a. The current that is generated in this virtual short circuit is sufficient to blow the fuse 27a, and interrupt a-c power to the load.

BULB 1, BULB 2 and BULB 3 circuits are included on the a-c output module 10 to indicate various operating conditions including triac failure. The BULB 1 circuit is connected between the junction of the triacs 25a–26a and a resistor 58, which provides a current path to the $-V_{a-c}$ terminal. When an output signal is being supplied to the load terminals, there is a sufficient current through the BULB 1 circuit to illuminate a neon bulb 32 seen in FIG. 2 to indicate that the output circuit 11 is "on" and functioning properly. A diode 38 and the BULB 2 circuit are connected across the main fuse 27a with the cathode of the diode 38 being connected on the side of the fuse 27a connected to the main triac 25a. The cathode of the diode 38 is also connected through resistors 31a and 58 to the $-V_{a-c}$ terminal. When the main fuse 27a is interrupted a current is conducted through the BULB 2 circuit on every half cycle which illuminates a neon bulb 33 seen in FIG. 2. The BULB 3 circuit in FIG. 1 is connected between the $+V_{a-c}$ terminal and one side of the switch 30a. Thus, when the secondary fuse link 28a is interrupted to actuate this switch 30a, a neon bulb 34, seen in FIG. 2, is illuminated to indicate a main triac failure.

As seen in FIG. 1, the other output drive circuits 12–14, as exemplified by the second output drive circuit 12, each have a BULB 1 circuit connected across a main triac 25b. There is not, however, a separate BULB 2 circuit for the second output drive circuit 12, because the junction between the main triac 25b and the main fuse 27b is connected in "diode OR" fashion through a diode 35 to the BULB 2 circuit in the first output circuit 11. Thus when the main fuse 27b in the second output drive circuit 12 is interrupted, a current is conducted from the $+V_{a-c}$ terminal through the BULB 2 circuit and the diode 35 to indicate the interruption of the fuse 27b. The normally open switches 30a–30b in the secondary fuses 29a–29b are also connected in parallel to one side of the BULB 3 circuit, which is connected on the other side to the $+V_{a-c}$ terminal. Therefore, when either of the switches 29a and 29b is operated by the interruption of its associated fuse link 28a–28b, the neon bulb 34 seen in FIG. 2 is illuminated to indicate that one of the load-control triacs 25a–25b in the output module 10 has failed. The BULB 2 and BULB 3 circuits also give fuse and triac expiration signals for the third and fourth output circuits 13 and 14, which are connected to these BULB circuits through BULB 2 and BULB 3 terminals seen in FIG. 1.

Figure 2:
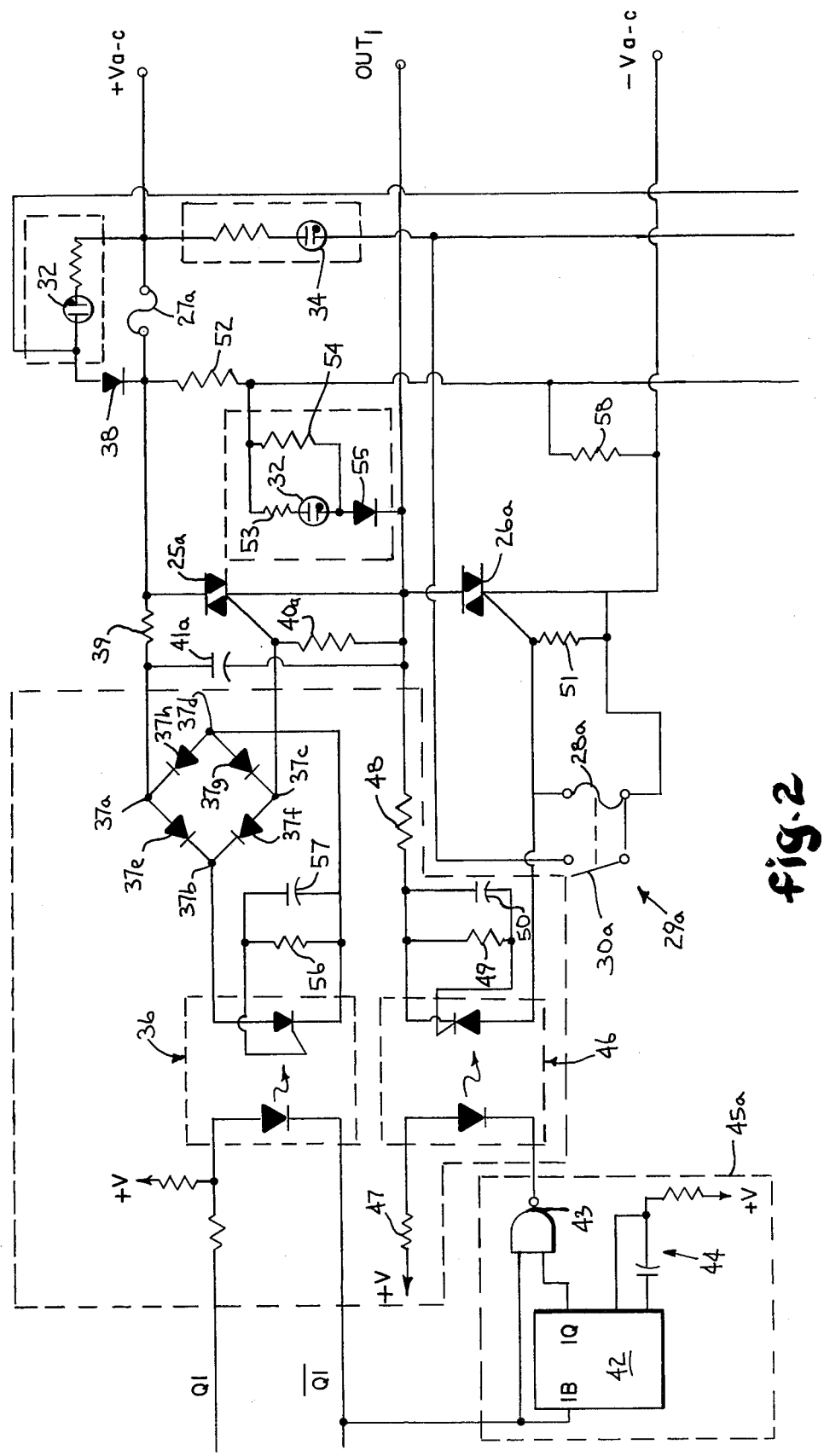
FIG. 2 is an electrical schematic diagram of a single output drive circuit in the module of FIG. 1.

In FIG. 2, the manner in which d-c digital inputs are converted to gate actuating signals for the triacs 25a and 26a is seen in more detail. The Q1 output from the latch 17 is coupled to an input side anode on a photo-SCR 36, and the $\overline{Q1}$ output is coupled to the cathode on the input side of this photo-SCR 36. The anode and cathode on the output side of this photo-SCR 36 are connected to junctions 37b and 37d, respectively, in a diode bridge rectifier 37. A gate on the output side of the photo-SCR 36 is connected through a resistor 56 in parallel with a capacitor 57 to junction 37d on the bridge rectifier 37. Junction 37a on the rectifier 37 is connected to one side of the main triac 25a through a resistor 39a. Junction 37c on the rectifier 37 is connected to the gate input on the main triac 25a and is also connected through a resistor 40a to the OUT$_1$ terminal. A capacitor 41a is connected across the resistor 39a and the main triac 25a to act as a snubber circuit for filtering transients on the supply line.

The Q1 output is connected to an input of a monostable multi-vibrator 42 and to an input on a NAND gate 43 both of which are included in a time delay circuit 45a. An RC coupling circuit 44 is connected to two inputs on the multi-vibrator 42 to provide a twenty millisecond time delay between the time a pulse is received at the input of the multi-vibrator 42 and the time the pulse is coupled through the NAND gate 43. The output of the NAND gate 43 is connected to a cathode on the input side of a second photo-SCR 46 and the anode on the input side of this photo-SCR 46 is pulled high through a pull-up resistor 47 by a positive voltage supply (+V). On the output side of the photo-SCR 46, a cathode is connected through a resistor 48 to a junction between the main triac 25a and the secondary triac 26a and to the OUT$_1$ terminal. A gate on the output side of the photo-SCR 46 is connected through a resistor 49 and a parallel capacitor 50 to the cathode of the photo-SCR 46. The anode is connected to the gate input on the secondary triac 26a. A resistor 51a is connected between this gate input and the $-V_{a-c}$ terminal, as is the fuse link 28a in the switch-operable secondary fuse 29a.

The main triac is turned to an "on" or conducting state when the inputs to drive circuit 11 are actuated by high and low logic signals received from the Q1 and $\overline{Q1}$ outputs on the latch 17 in FIG. 1. This causes current to be conducted through the output side of the photo-SCR 46 and diodes 37e and 37g to the gate input on the main triac 25a. The signal at the gate input is sufficient to turn on the main triac 25a and provide a signal at the load output terminals OUT$_1$ and $-V_{a-c}$. The neon bulb 32 in the BULB 1 circuit is turned on by a current through resistors 52 and 53, another resistor 54 being provided to shunt some of the current around the bulb 32. A diode 55 is provided in the BULB 1 circuit to block current during each positive half cycle when a signal is provided to the load terminals OUT$_1$ and $-V_{a-c}$.

To cut off the a-c output, a d-c signal of opposite logic state is coupled through the "00" input in FIG. 1 to the D1 input on the latch 17. A low or false logic signal is coupled through the Q1 output, and a high false signal is coupled through the $\overline{Q1}$ output to the inputs in FIG. 2. The first photo-SCR 36 stops conducting immediately, however the second photo-SCR 46 does not attempt to turn on until the multi-vibrator 42 has timed out and a logic low pulse is coupled to the cathode on the input side of the second photo-SCR 46. At a nominal 60 hertz frequency this allows the a-c waveform across the main triac 25a to cross the zero threshold between a positive and negative half cycle at which time, with no gate signal present, the main triac 25a is turned off. If the main triac has failed, however, and remains "on," the second photo-SCR 46 will conduct on the next available negative half cycle of signal provided by the a-c voltage supply. Current flows through the fuse link 28a in the secondary fuse 29a to cause it to be interrupted and to actuate the switch 30a included in the secondary fuse 29a. When the fuse link 28a is interrupted, current through resistor 51a generates a signal at the gate input of the second triac 26a that is sufficient to turn it to an "on" or conducting state, so that both triacs 25a and 26a are conducting. The two triacs 25a and 26a continue to conduct current until the main fuse is interrupted at which time the neon bulb 33 in the BULB 2 circuit is illuminated.

It can be seen from this description that if the main triac 25a turns off at the appropriate time the secondary triac 26a will never turn on. The chances of the secondary triac 26a failing from a short circuit are remote. If, however, the secondary triac 26a is shorted for some inexplicable reason while the main triac 25a is turned off, the next time that the main triac 25a is switched to a conducting state, the main fuse link 27a will be interrupted and neon bulb 33 will be illuminated.

The invented circuit, therefore, solves the problem of possible short circuit triac failures while retaining the usefulness of triacs in controlling a-c output devices.

I claim:

1. An output circuit responsive to digital signals to couple and decouple an a-c supply to a load, the output circuit comprising:
   (a) a main fuse;
   (b) a first electronic switch connected in series with the main fuse across a first a-c supply terminal and a first load output terminal, the first electronic switch having a gate input for receiving a first actuate signal;
   (c) a second electronic switch connected in series with the first electronic switch and the main fuse and connected between the first load output terminal and a common second terminal for the a-c supply and the load, the second electronic switch having a gate input for receiving a second actuate signal;
   (d) means responsive to an "on" digital input signal for coupling the first actuate signal to the gate input of the first electronic switch; and
   (e) means responsive to an "off" digital input signal only when the first electronic switch is still conducting for coupling the second actuate signal to the gate input of the second electronic switch to cause it to conduct a current that is sufficient to interrupt the main fuse.

2. An output circuit responsive to digital signals to couple and decouple an a-c supply to a load, the output circuit comprising:
   (a) a main fuse;
   (b) a first electronic switch connected in series with the main fuse across a first a-c supply terminal and a first load output terminal, the first electronic switch having a gate input for receiving a first actuate signal;
   (c) a second electronic switch connected in series with the first electronic switch and the main fuse and connected between the first load output terminal and a common second terminal for the a-c supply and the load, the second electronic switch having a gate input for receiving a second actuate signal;
   (d) means responsive to an "on" digital input signal for coupling the first actuate signal to the gate input of the first electronic switch;
   (e) means responsive to an "off" digital input signal when the first electronic switch is still conducting for coupling the second actuate signal to the gate input of the second electronic switch to cause it to conduct a current that is sufficient to interrupt the main fuse;
   (f) switch means connected between the gate input of the second electronic switch and the common terminal for the a-c supply and the load, the switch means being operated when an "off" digital signal is received while the first electronic switch is still conducting; and
   (g) fault indicating means coupled between the switch means and the first a-c supply terminal for signalling the failure of the first electronic switch in response to the operation of the switch means.

3. The output drive circuit of claim 2, wherein the switch means is operated prior to the interruption of the main fuse.

4. The output drive circuit of claim 2, further comprising:
   a second output drive circuit that includes elements (a)–(f); and
   wherein one side of the switch means in the second output drive circuit is connected in parallel with the switch means in the first output drive circuit to the fault indicating means.

5. The output drive circuit of claim 1, wherein the means for coupling actuate signals to the gate input of the second electronic switch includes time delay means for delaying the application of an "off" digital input signal to the gate of the second electronic switch for a time sufficient for the first electronic switch to return to a non-conducting state, if the first electronic switch has not failed.

6. In a controller output circuit responsive to digital signals from a controller processor to couple and decouple an a-c supply to a load, an output drive circuit comprising:
   (a) a main fuse;
   (b) a first triac connected in series with the main fuse across a first a-c supply terminal and a first load output terminal, the first triac having a gate input for receiving a first actuate signal;
   (c) a second triac connected in series with the first triac and the main fuse and connected between the first load output terminal and a common second terminal for the a-c supply and the load, the second triac having a gate input for receiving a second actuate signal;
   (d) a switch-actuating secondary fuse having a fuse link connected between the gate input of the second triac and the common terminal for the a-c supply and the load, the fuse also having a switch which is connected on one side to the common terminal and which is actuated when the secondary fuse link is interrupted;
   (e) triac failure indicating means coupled between the other side of the secondary fuse switch and the first a-c supply terminal, for signalling a triac failure when the secondary fuse link has been interrupted;
   (f) means responsive to a true digital input signal for coupling the first a-c actuate signal to the gate input of the first triac; and
   (g) means responsive to a false digital input signal when the first triac is still conducting for interrupting the secondary fuse link to both actuate the triac-failure indicating means and couple an actuate signal to the gate input of the second triac, wherein sufficient current is conducted by the two triacs to interrupt the main fuse.

* * * * *

UNITED STATES PATENT AND TRADEMARK OFFICE
CERTIFICATE OF CORRECTION

PATENT NO. : 4,322,771
DATED : March 30, 1982
INVENTOR(S) : Odo J. Struger

It is certified that error appears in the above—identified patent and that said Letters Patent is hereby corrected as shown below:

Column 2, line 65    "$\overline{Q1}$-$\overline{Q4}$" should be --Q1-Q4"

Column 2, Line 66    "Q1-Q4" should be --$\overline{Q1}$-$\overline{Q4}$"

Signed and Sealed this

Fifteenth Day of June 1982

[SEAL]

Attest:

GERALD J. MOSSINGHOFF

Attesting Officer    Commissioner of Patents and Trademarks